United States Patent [19]

Lind

[11] Patent Number: 5,352,077

[45] Date of Patent: Oct. 4, 1994

[54] FIXING ELEMENT, IN PARTICULAR FOR FIXING FACING PANELS

[75] Inventor: Stefan Lind, Tumlingen, Fed. Rep. of Germany

[73] Assignee: Fischerwerke, Artur Fischer GmbH & Co. KG, Tumlingen, Fed. Rep. of Germany

[21] Appl. No.: 70,347

[22] PCT Filed: Jan. 13, 1993

[86] PCT No.: PCT/EP93/00052

§ 371 Date: May 28, 1993

§ 102(e) Date: May 28, 1993

[87] PCT Pub. No.: WO93/15288

PCT Pub. Date: Aug. 5, 1993

[30] Foreign Application Priority Data

Jan. 31, 1992 [DE] Fed. Rep. of Germany ....... 4202774

[51] Int. Cl.⁵ .................... F16B 13/04; F16B 13/06
[52] U.S. Cl. ........................... 411/43; 411/60; 411/69; 411/72
[58] Field of Search ............ 411/34, 37, 43, 57, 411/60, 61, 62, 71–74, 69

[56] References Cited

U.S. PATENT DOCUMENTS

| | | |
|---|---|---|
| 2,370,327 | 2/1945 | Rosan . |
| 3,390,601 | 7/1968 | Summerlin .............. 411/43 |
| 4,388,031 | 6/1983 | Rodgers .................. 411/43 |
| 4,789,283 | 12/1988 | Crawford ............... 411/34 X |
| 4,949,450 | 8/1990 | Scharres ............... 411/43 X |

FOREIGN PATENT DOCUMENTS

| | | |
|---|---|---|
| 0328314 | 8/1989 | European Pat. Off. . |
| 1450992 | 4/1969 | Fed. Rep. of Germany . |
| 1778752 | 5/1972 | Fed. Rep. of Germany . |
| 2914074 | 10/1980 | Fed. Rep. of Germany . |
| 3729330 | 3/1989 | Fed. Rep. of Germany . |
| 8908858 | 7/1989 | Fed. Rep. of Germany . |
| 3811249 | 10/1989 | Fed. Rep. of Germany . |
| 4011229 | 8/1991 | Fed. Rep. of Germany . |
| 4014812 | 11/1991 | Fed. Rep. of Germany . |
| 2954501 | 8/1987 | France . |
| 471963 | 6/1969 | Switzerland . |
| 2006370 | 5/1979 | United Kingdom . |

Primary Examiner—Neill R. Wilson
Attorney, Agent, or Firm—Michael J. Striker

[57] ABSTRACT

A fixing element of metal, in particular for fixing facing panels, has a slotted expansible sleeve arranged to be expanded into an undercut of a drilled hole and having an inner bore with a slotted part, and an expander element effecting an expansion of the expansible sleeve and arranged to clamp an article to a facing panel. The expansible sleeve has a plurality of inwardly bent expansible segments having a leading end face and an outer surface and provided with a circumfernetial enlargement arranged on the outer surface of the expansible segment in the region of the leading end face. The expander element is formed as a blind rivet with a rivet shank and a clench head which is drawn with the rivet shank into the slotted part of the inner bore of the expansible sleeve and riveted.

6 Claims, 1 Drawing Sheet

U.S. Patent     Oct. 4, 1994     5,352,077

FIXING ELEMENT, IN PARTICULAR FOR FIXING FACING PANELS

BACKGROUND OF THE INVENTION

The present invention relates to a fixing element of metal.

More particularly, it relates to a fixing element which has a slotted expansible sleeve arranged to be expanded into an undercut of a drilled hole, and an expander element effecting the expansion and having a head for clamping an article to a facing panel.

The invention relates to a fixing element of metal according to the preamble of claim 1.

To fix facing panels that are relatively thin in thickness, drilled holes of very small depth and with an undercut are made on the rear side of the facing panel. Conventional fixing elements with expansible sleeves are little suited to this application, since the expansible sleeve is driven using hammer blows onto an expander element resting at the bottom of the bore in order to effect anchorage of the fixing elements. The facing panel could be broken or the bore punched through by the hammer blows.

DE 40 11 229 A1 discloses a fixing element in which these disadvantages are avoided. Instead of an expansible sleeve, this fixing element uses a metallic ring bent into a roof shape, the bent ends of which rest on the conical outer surface of an expander cone resting at the bottom of the drilled hole. Using a setting tool the ring can be pressed flat by slight pressure and bent into the undercut of the drilled hole. In order to avoid the bore being punched through thin facing panels, the pressure force applied has to be judged exactly. A device of that kind is therefore expensive and generally set up at a fixed location. The fixing elements are applied to the facing panels at this location and the panels are then transported to wherever they are to be installed. Because the fixing bolts project beyond the rear side of the facing panels, these cannot be stacked for transport. Shifting the panels and relatively long transportation distances therefore adversely affect the operating process.

SUMMARY OF THE INVENTION

Accordingly, it is an object of the present invention to provide a fixing element which avoids the disadvantages of the prior art.

The invention is therefore based on the problem of producing a fixing element, in particular for fixing facing panels, which can be mounted in a simple and reliable manner even in very thin facing panels without using a complicated setting tool.

In keeping with these objects and with others which will become apparent hereinafter, one feature of the present invention resides, briefly stated, in a fixing element in which, in accordance with the inventive features, the expansible sleeve has inwardly bent expansible segments with a circumferential enlargement on their outer surface in the region of their leading end face, and the expander element is formed as a blind rivet with a clench head drawn with a rivet shank into a slotted part of the inner bore of the expansible sleeve and riveted. For anchoring, the fixing element is inserted into a prepared drilled hole in the facing panel until the end face of the expansible sleeve rests at the bottom of the drilled hole. The blind rivet with its clench head in front is then inserted through a bore of the article to be fixed to the rear of the facing panel and through the inner bore of the expansible sleeve until the rivet head rests against the outer surface of the article to be fixed. Using rivetting pliers, the clench head of the blind rivet is drawn by way of the rivet shank into the slotted part of the inner bore of the expansible sleeve and rivetted. The compression and deformation of the clench head expands the expansible segments and the enlargement arranged on the outer face is pressed into the undercut of the drilled hole. At the same time, the article to be fixed is clamped by the rivet head against the rear side of the facing panel. The article may be a hook, fixing bracket or the like, with which the facing panel can be affixed or screwed to a subconstruction. An invisible fixing of the facing panels is thereby achieved, which withstands high pressure forces and pulling forces. The plastically deformed clench head of the blind rivet supports the expansible segments, thus producing an interlocking connection with the facing panel.

In order to achieve a satisfactory expansion pressure for expanding the expansible segments, it is advantageous for the inner bore of the expansible sleeve to have a cylindrical portion in its unslotted part and adjoining that a widened region in the form of a truncated cone, which tapers again towards the leading end of the expansible sleeve to the diameter of the cylindrical portion.

Retraction of the clench head of the blind rivet is facilitated in that the inner bore at the front end of the expansible sleeve is provided with a recess.

Finally, to improve the distribution of the expansion force, the enlargement can have either a saw-toothed profile with a sloping face inclined towards the rear end of the expansible sleeve or a trapezoidal profile.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
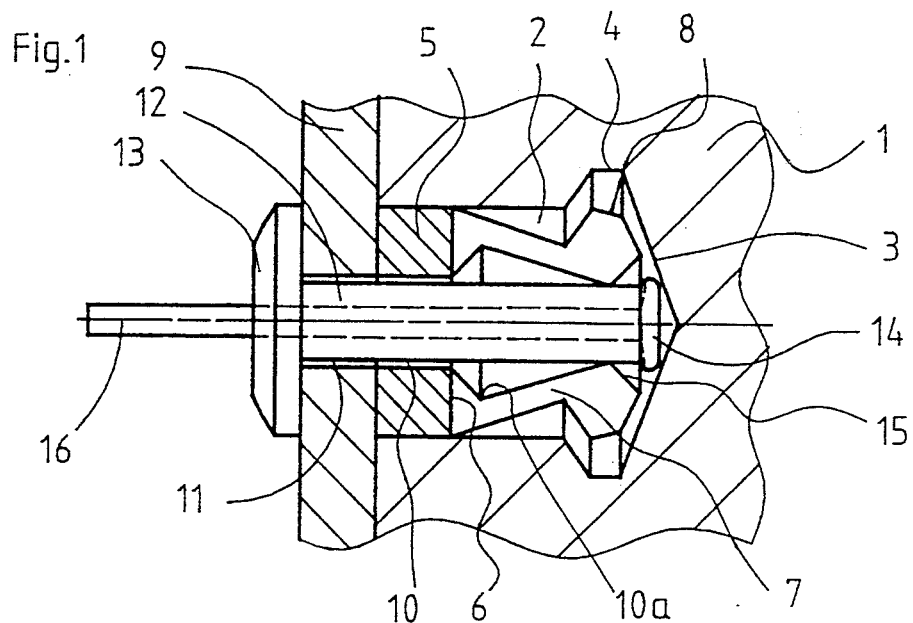
FIG. 1 shows a fixing element inserted in a facing panel.

FIG. 1 shows a facing panel 1 with a drilled hole 2 which has an undercut 4 in the region of the bottom 3 of the drilled hole. An undercut of this kind can be produced by means of conventional reaming-out devices and is not the subject of the present invention.

The expansible sleeve 5 is inserted into the drilled hole 2 until the leading end face of the expansible sleeve rests at the bottom 3 of the drilled hole. For introduction of the expansible sleeve, expansible segments 7 created by slits 6 are bent inwards sufficiently far for the circumferential enlargement 8 arranged on the outer face of the expansible segments 7 to have a diameter corresponding to the diameter of the hole drilled in the facing panel 1. The expansible sleeve 5 can therefore be inserted completely in the hole 2 drilled in the facing panel 1.

Once the article 9 to be fixed, for example, a hook, fixing bracket or the like, has been positioned on the rear of the facing panel 1, a blind rivet 12 is inserted through the bore 11 of the article 9 aligned with the inner bore 10 of the expansible sleeve 5 until the rivet head 13 rests against the outer face of the article 9 to be fixed. The length of the blind rivet 12 is such that the clench head end 14 of the blind rivet 12 penetrates right through the expansible sleeve 5. In the unslotted part of the expansible sleeve 5 the inner bore 10 is cylindrical. Adjoining the cylindrical portion is a widened region 10a in the form of a truncated cone which by virtue of the inward bend in the expansible segments 7 tapers again towards the leading end of the expansible sleeve to the diameter of the cylindrical portion of the inner bore 10. Furthermore, the inner bore is provided at the leading end of the expansible sleeve 5 with a recess 15.

Figure 2:
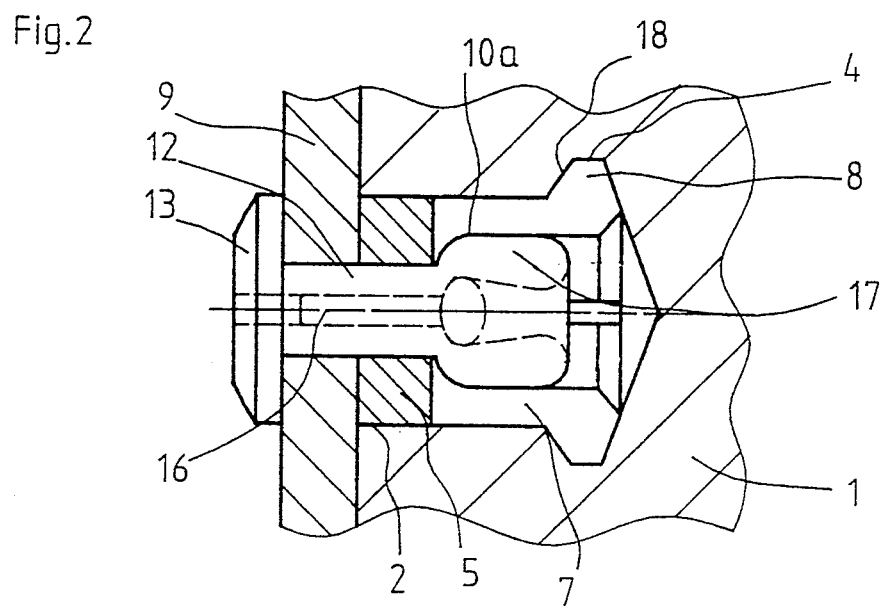
FIG. 2 shows the fixing element of FIG. 1 in its expanded state.

FIG. 2 shows the interlocking anchorage of the expansible sleeve 5 by expansion of the expansible segments 7 and the engagement of the enlargement 8 in the undercut 4 of the drilled hole 2. The expansion of the expansible segments 7 is effected by retracting the clench head 17 arranged on the rivet shank 16 into the blind rivet 12. Riveting pliers (not illustrated) are used for the retraction and rivetting. After retraction of the clench head 17 and the rivetting, the rivetting pliers are used to tear off the rivet shank 16 inside the blind rivet 12. The deformation of the clench head 17 in the widened region 10a of the inner bore 10 of the expansible sleeve 5 enables the expansible segments 7 to be sufficiently far expanded and braced for the enlargement 8 to engage with an interlocking fit in the undercut 4 of the drilled hole 2. At the same time, clamping of the article 9 to be fixed against the rear of the facing panel 1 is effected by the rivet head 13. The saw-toothed or trapezoidal profile of the enlargement 8 with a sloping face 18 inclined towards the rear end of the expansible sleeve produces a clamped connection of the article 9 to the facing panel 1.

Figure 3:
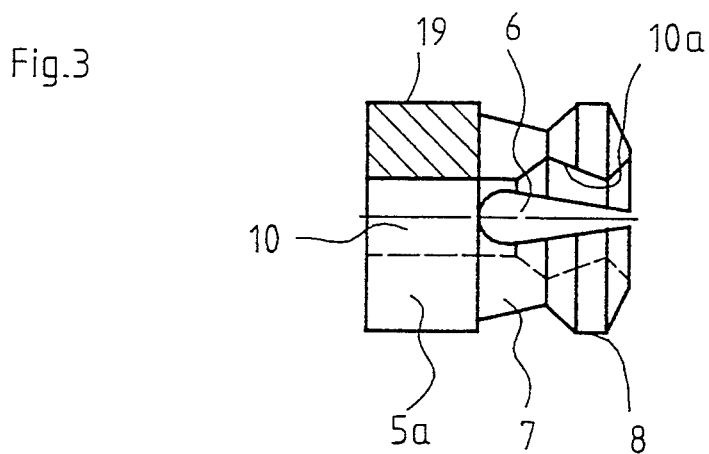
FIG. 3 shows a further example of the expansible sleeve of the fixing element.

In the expansible sleeve 5a illustrated in FIG. 3, the expansible segments 7 formed by slits 6 have a reduced outer diameter. After forming the inner bore 10 with the widened region 10a, the expansible segments 7 bend in sufficiently far for the outer diameter of the circumferential enlargement 8 to correspond approximately to the diameter of the rear portion 19 of the expansible sleeve 5a.

It will be understood that each of the elements described above, or two or more together, may also find a useful application in other types of constructions differing from the types described above.

While the invention has been illustrated and described as embodied in a fixing element of metal, in particular for fixing facing panels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fixing element of metal, in particular for fixing facing panels, the fixing element comprising a slotted expansible sleeve arranged to be expanded into an undercut of a drilled hole and having an inner bore and a slotted part provided with a plurality of inwardly bent expansible segments each having a leading end face and an outer surface with a circumferential enlargement in the region of said leading end face; and an expander element effecting the expansion of said expansible sleeve and arranged to clamp an article to a facing panel, said expander element being formed as a blind rivet with a rivet shank and a clench head which is drawn with said river shank into said slotted part of said inner bore of said expansible sleeve and riveted.

2. A fixing element as defined in claim 1, wherein said expander element has a head for clamping an article to a facing panel.

3. A fixing element as defined in claim 1, wherein said expansible sleeve has a leading end, said inner bore of said expansible sleeve having an unslotted part including a cylindrical portion and an adjoining wider region formed as a truncated cone which tapers toward said leading end of said expansible sleeve to a diameter of said cylindrical portion.

4. A fixing element as defined in claim 1, wherein said expansible sleeve has a leading end, said inner bore of said expansible sleeve being provided with a recess at said leading end.

5. A fixing element as defined in claim 1, wherein said expansible sleeve has a rear end, said enlargement having a saw-toothed profile with a sloping face which is inclined toward said rear end of said expansible sleeve.

6. A fixing element as defined in claim 1, wherein said expansible sleeve has a rear end, said enlargement having a trapezoidal profile with a sloping face which is inclined toward said rear end of said expansible sleeve.

* * * * *